UNITED STATES PATENT OFFICE.

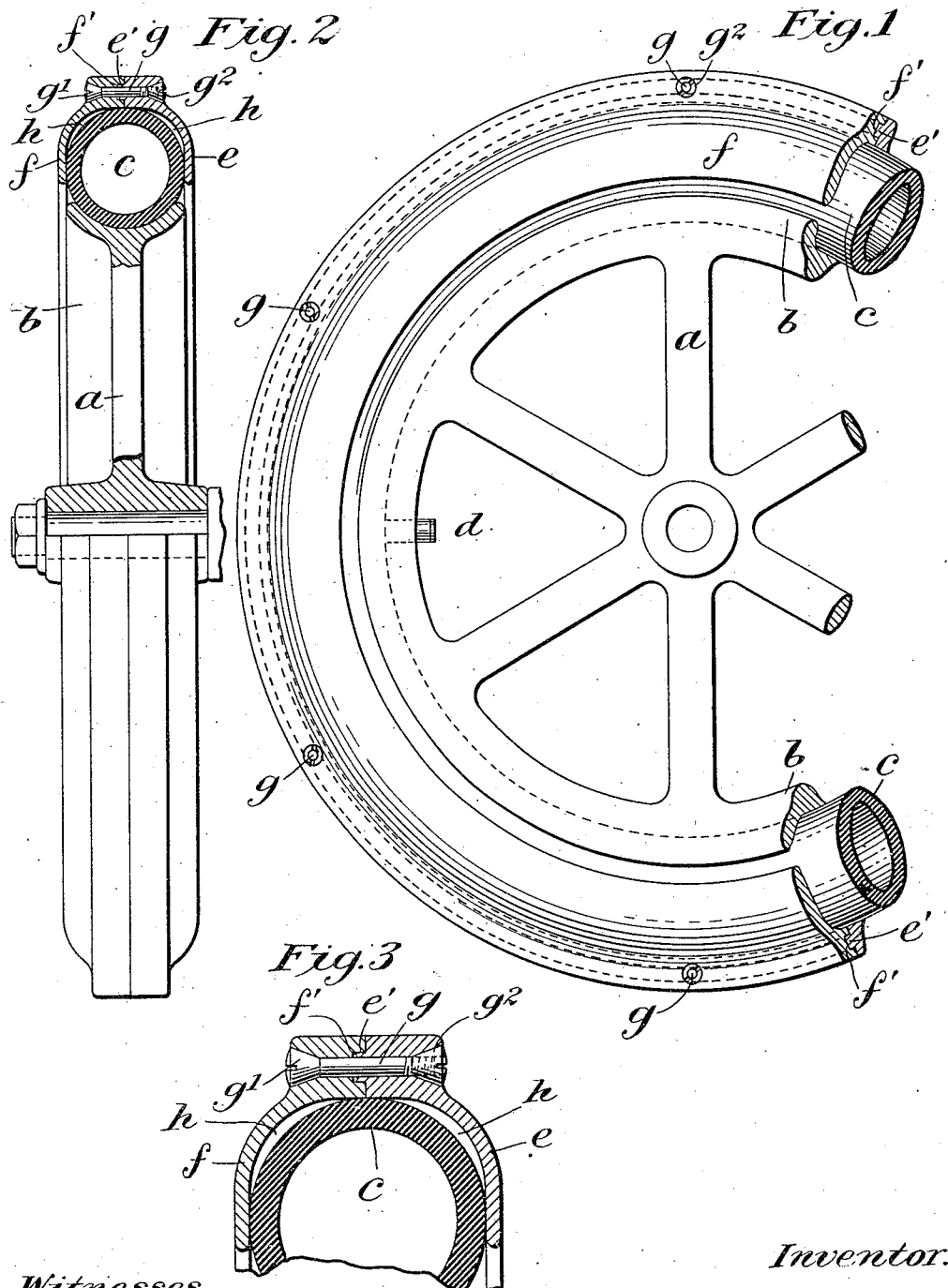

JOHN THOMSON, OF NEW YORK, N. Y., ASSIGNOR TO TRIDENT TIRE COMPANY, OF NEW YORK, N. Y., A CORPORATION OF NEW YORK.

WHEEL.

No. 837,151.  Specification of Letters Patent.  Patented Nov. 27, 1906.

Application filed September 16, 1905. Serial No. 278,706.

*To all whom it may concern:*

Be it known that I, JOHN THOMSON, a citizen of the United States, residing in the borough of Manhattan, city of New York, in the State of New York, have invented certain new and useful Improvements in Wheels, of which the following is a specification, reference being had to the accompanying drawings, forming a part hereof.

This invention relates particularly to provisions for protecting the tubular pneumatic tires of vehicle-wheels from injury.

Metallic shields have been applied heretofore to the treads of pneumatic tires, such shields consisting in some cases of independent plates or segments and in other cases of continuous metallic treads.

It is the object of the present invention to improve the construction of protective devices of the class last referred to with a view particularly to the better protection of the pneumatic tire from injury by lateral thrusts and wrenches, as well as by abrasive action and puncture.

A further object is to provide a shield which can be readily applied to any tire and at the same time capable of enduring the heavy punishment to which such tires are subjected.

The invention will be more fully explained hereinafter with reference to the accompanying drawings, in which it is illustrated, and in which—

Figure 1 is a partial view in side elevation, with parts broken away, of a wheel to which the present improvement is applied. Fig. 2 is a view, partly in edge elevation and partly in central section, of the wheel shown in Fig. 1. Fig. 3 is a detail view in transverse section and on a larger scale, illustrating particularly the means for securing together the shield-sections.

The invention is illustrated in the drawings as applied to a wheel $a$, which may be of ordinary construction, having a rim or felly $b$ adapted to support a tubular pneumatic tire $c$, cylindrical in cross-section, the same being provided with a valved inflation-nipple $d$, projected through the wheel-rim $b$, as usual. The improved shield consists of two rigid metallic shield-sections $e$ and $f$, which are secured together by bolts $g$, which pass through the tread portion of the two sections. One of such sections is provided in its meeting face with a circular channel $f'$ to receive a corresponding rib $e'$, formed on the meeting face of the other shield-section $e$, so that both shield-sections shall equally sustain all heavy shocks and strains delivered to either one, thus relieving the bolts $g$ of all function other than that of maintaining the shield-sections in engagement sidewise. As shown particularly in Fig. 3, the head $g'$ of the bolt $g$ is conical and the nut $g^2$, which is applied to the other end of the bolt, is also conical, such head and nut engaging correspondingly-tapered seats in the shield-sections. The conical surfaces of the head and nut bite very intimately the seats formed therefor in the shield-sections, and therefore prevent the accidental loosening of the bolts by vibration, while yet the bolts can be readily disengaged and withdrawn whenever necessary.

The two shield-sections, as will be observed upon reference to Figs. 2 and 3 of the drawings, form a shield which extends inward beyond the middle of the pneumatic tire and fits the same snugly in a plane of its greatest width, while between these points and the tread portions, where the shield bears upon the outer face of the pneumatic tire, there is provided space, as at $h$, into which the tire $c$ may flow or expand as it is distorted under pressure. By extending the shield inward beyond the middle plane of the pneumatic tire the latter is steadied and supported in such a manner as to better enable it to resist said thrusts and the wrenching strains, while through the close engagement of the shield with the tire at the sides dirt and grit may be excluded from the space between the pneumatic tire and the shield. Furthermore, the practical incasing of the pneumatic tire, except at the narrow zones between the rim $b$ and the edges of the shield, supports the tire at all points, and therefore permits the tire to be used satisfactorily, although inflated to a less degree than usual, whereby the tire may be less heavily constructed without sacrificing durability.

I claim as my invention—

1. The combination with a pneumatic tire for vehicles, of a rigid metallic shield which is extended inwardly beyond the middle plane of the pneumatic tire and bears snugly against the sides thereof and comprises two circumferentially-separable sections and means for securing said sections together, said shield being formed to provide spaces between the side bearings and the tread portion into which the pneumatic tire may flow when distorted under pressure, substantially as described.

2. The combination with a pneumatic tire for vehicles, of a rigid metallic shield which is extended inwardly beyond the middle plane of the pneumatic tire and bears snugly against the sides thereof and comprises two circumferentially-separable sections, one of said sections having in its meeting face a circular channel and the other a rib to enter the same, and means to secure the said sections together, substantially as described.

3. The combination with a pneumatic tire for vehicles, of a rigid metallic shield which is extended inwardly beyond the middle plane of the pneumatic tire and bears snugly against the sides thereof and comprises two circumferentially - separable sections, and bolts and nuts to secure said sections together the bolt-heads and the nuts being conical to engage corresponding seats in the shield-sections, substantially as described.

This specification signed and witnessed this 15th day of September, 1905.

JOHN THOMSON.

In presence of—
  THOMAS J. CANTY,
  W. B. GREELEY.